US006237437B1

(12) United States Patent
Takahashi

(10) Patent No.: US 6,237,437 B1
(45) Date of Patent: May 29, 2001

(54) TURN SIGNAL SWITCH

(75) Inventor: Atsuo Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/360,816

(22) Filed: Jul. 26, 1999

(30) Foreign Application Priority Data

Jul. 28, 1998 (JP) ................................................ 10-212777

(51) Int. Cl.[7] .............................. H01H 25/04; B62D 1/16

(52) U.S. Cl. .................. 74/484 R; 200/61.3; 200/61.34; 200/61.35

(58) Field of Search ....................... 74/484 R; 200/61.27, 200/61.3, 61.34, 61.35, 61.36; 267/173, 180, 108

(56) References Cited

U.S. PATENT DOCUMENTS 3,794,785 * 2/1974 Tomlinson ........................ 200/61.27
5,030,802 * 7/1991 Noro ................................ 200/61.27
5,385,067 * 1/1995 Wiersing et al. .................. 74/484 R
5,575,177 * 11/1996 Poleschuk et al. ................ 74/484 R

FOREIGN PATENT DOCUMENTS 0 778 176 A2 6/1997 (EP) .
57-199146 * 12/1982 (JP) .

* cited by examiner

*Primary Examiner*—David A. Bucci
*Assistant Examiner*—William C Joyce
(74) *Attorney, Agent, or Firm*—Brinks Hofer Gilson & Lione

(57) ABSTRACT

A turn signal switch includes a housing having a cam portion; a control lever turnably supported in the housing; a driving element for holding the control lever at three positions, first and second operating positions and a neutral position, in cooperation with the cam portion; a lever member turnably supported in the housing so as to return the control lever from the first and second operating positions to the neutral position; and a spring member for elastically urging the lever member toward a canceling projection that turns together with the steering wheel. The lever member is retracted outside the locus of turning of the canceling projection by the control lever when the control lever is in the neutral position, and is advanced inside the locus of turning of the canceling projection by the urging force of the spring member so that the spring member is in elastic contact with the lever member at one point when the control lever is in the first or second operating position.

8 Claims, 14 Drawing Sheets

TURN SIGNAL SWITCH

BACKGROUND OF THE INVENTION

1. Field of the Invention

The present invention relates to a turn signal switch to be used as a direction indicator, which is attached to a steering column of an automobile or the like, and more particularly, to a canceling mechanism for causing a control lever provided for a turn signal switch to automatically return to the neutral position.

2. Description of the Related Art

In a turn signal switch for an automobile, the base end of a control lever is turnably supported in a housing that is incorporated with a steering column or the like, and the leading end of the control lever is turned from the neutral position to the right-direction indicating position or the left-direction indicating position, thereby causing a left-turn lamp or a right-turn lamp to blink.

In order to hold the control lever at three positions, the right-direction indicating position, the left-direction indicating position, and the neutral position, in the turn signal switch, a cam portion is formed on the inner surface of the housing, and a driving element is provided in the control lever via a spring so as to be engaged with the cam portion. A canceling mechanism is also provided to cause the control lever, which has been turned in the right-direction indicating position or the left-direction indicating direction, to automatically return to the neutral position when the steering wheel is turned in the direction opposite from the indicating direction.

FIGS. 10 to 16 illustrate a canceling mechanism of a turn signal switch previously proposed by the present applicant (see European Patent No. 0 778 176 A2). FIG. 10 is an exploded perspective view of the turn signal switch, as viewed from below, FIG. 11 is a perspective view showing how a first holder is incorporated into a case, FIG. 12 is a perspective view showing how a first lever member and a press spring are further incorporated in the state shown in FIG. 11, FIG. 13 is a perspective view showing how a second lever member is further incorporated in the state shown in FIG. 12, FIG. 14 is a perspective view showing how a cover is incorporated in the state shown in FIG. 13, FIG. 15 is a plan view of the turn signal switch in the neutral state, from which the cover is removed, for illustrating the operation thereof, and FIG. 16 is a plan view of the turn signal switch, from which the cover is removed, in a state in which the control lever is switched to the right-turn or left-turn direction, also for illustrating the operation thereof.

The canceling mechanism of this turn signal switch mainly comprises a case 121 attached to a steering cover (not shown), first and second holders 131 and 141 contained in the case 121, first and second lever members 151 and 161 placed on the upper surface of the first holder 131, and a cover member 171 for covering the top opening of the case 121.

As shown in FIG. 11, the case 121 includes a recessed portion 122 for containing the first holder 131, which recessed portion 122 is opened on one side and has a pair of cam faces 123, forming a depression at the center, on the other side face; and a stepped portion 124 formed at a lower position than the top end face of the case 121. Two pins 125 and 126 are provided at a predetermined interval on the upper surface of the stepped portion 124, and a slot 127 is formed at about the midpoint therebetween. High portions 123*a* and 123*b* are formed at the ends of the cam faces 123, and a retaining hole 128 is formed in the recessed portion 122 on the side opposite from the side of the cam faces 123.

The first holder 131, which is opened on one side, is inserted in the recessed portion 122 so that it can pivot horizontally. The first holder 131 has, on the side opposite from the open side, a driving element support portion 134 in which a driving element 132 is inserted. The driving element 132 is slidably inserted in the driving element support portion 134 via a spring 133, and the leading end thereof is always pressed against the cam faces 132 by the spring 133.

The first holder 131 has retaining pins 135 and 136 on the upper and lower surfaces on the open side, respectively, and a retaining groove 137 on the upper surface on the side of the driving element support portion 134. The first holder 131 also has retaining holes 138 formed in the right and left side faces on the open side.

The second holder 141 is approximately T-shaped so that a head portion 142 intersects one end of a base portion 143 at right angles. Retaining pins 144 stand at both ends of the head portion 142 so as to be rotatably passed through the retaining holes 138 of the first holder 131. The base portion 143 is inserted in an open end portion of a control lever 145, and is fixed by a spring pin 146.

The first lever member 151 is placed on the stepped portion 124 so that a retaining pin 152 standing on the lower surface thereof is loosely fitted in the slot 127 formed in the upper surface of the stepped portion 124. The first lever member 151 also has an engaging projection 153 that projects outside the case 121. The engaging projection 153 engages with a projection 183 provided in a canceling cam 182 that turns together with a steering shaft 181, as shown in FIGS. 15 and 16. The first lever member 151 also has a receiving portion 154 on the upper surface on the side of the engaging projection 153, and an engaging pin 155 on the opposite side.

After the first lever member 151 is placed on the stepped portion 124 of the case 121 so that the engaging pin 152 is loosely fitted in the slot 127, a spring member 156 is mounted so as to regulate the first lever member 151 on the stepped portion 124, as shown in FIG. 12. The spring member 156 includes a pair of winding portions 156*a* that are arranged at a slightly longer interval than that between the two pins 125 and 126, and end portions 156*b* that extend inward from the winding portions 156*a*, respectively, so as to intersect each other, and that are rounded at the end.

The winding portions 156*a* of the spring member 156 are fitted on the two pins 125 and 126 so that the end portions 156*b* abut on the receiving portion 154, whereby the part of the spring member 154 between the winding portions 156*a* is bent toward the end portions 156*b*, and the first lever member 151 is supported while being urged toward the outside of the case 121.

The second lever member 161 has a cam hole 162 with an angular cam side 162*a* on its upper surface, and a pair of support projections 164 which project from its back surface on the side opposite from the cam side 162*a* so as to support both ends of a coil-shaped action spring 163.

The support projections 164, which are holding the action spring 163, are inserted in the retaining groove 137 of the first holder 131, and the retaining pin 155 of the first lever member 151 is inserted in the cam hole 162 from below.

The cover member 171 covers the top opening of the case 121, and the retaining pin 135 of the first holder 131 is inserted in a retaining hole 172 formed in the upper surface of the cover member 171, thereby allowing the first holder 131 to reliably pivot on the retaining pins 135 and 136.

Next, a description will be given of the operation of the canceling mechanism in the turn signal switch. When the control lever 145 is in the neutral position, as shown in FIG. 15, the engaging pin 155 of the first lever member 151 is in contact with the top of the cam side 162*a* of the second lever member 161, and the retaining pin 152 is retracted by a distance that is defined by the slot 127 against the spring member 156. Therefore, the engaging projection 153 of the first lever member 151 is also retracted outside the locus of turning of the projection 183 of the canceling cam 182 that turns together with the steering shaft 181.

Even when a steering wheel (not shown) is turned in this state, the projection 183 of the canceling cam 182 does not make contact with the engaging projection 153 of the first lever member 151, and the first and second holders 131 and 141 and the control lever 145 remain in the neutral position.

When the control lever 145 is turned from the neutral position in the direction of the arrow B in FIG. 15, the first holder 131 also turns about the retaining pin 135 in the counterclockwise direction, as shown in FIG. 16. The driving element 132 at the leading end of the first holder 131 thereby passes over the high portion 123*a* of the lower cam face 123 in the figure, and is retained thereat. Therefore, the second lever member 161 is also kept in that position as well as the first holder 131 and the control lever 145, and, for example, a left-turn signal switch (not shown) is activated by the first holder 131.

With the turn of the second lever member 161, the engaging pin 155 of the first lever member 151 is moved along the upper slope of the cam side 162*a* of the second lever member 161 in the figure. This movement is reliably made because the end portions 156*b* of the spring member 156 elastically press the receiving portion 154 of the first lever member 151 leftward in the figure.

By the movement of the first lever member 151, the engaging pin 152 thereof makes contact with the opposite side (the left end in FIG. 16) of the slot 127, thereby stopping the movement of the first lever member 151. In this state, the engaging projection 153 of the first lever member 151 is also advanced inside the turn locus of the projection 183 of the canceling cam 182, as shown in FIG. 16.

The state shown in FIG. 16 is maintained by the press of the driving element 132 by the spring 133 at the position beyond the high portion 123*a* of the cam face 123. When the steering wheel shaft 181 is turned in reverse (in the direction of the arrow of FIG. 16) by reversing the steering wheel in this state, the projection 183 of the canceling cam 182 makes contact with the engaging projection 153.

When the engaging projection 153 is pushed, the first lever member 151 turns counterclockwise about the engaging pin 152 in a manner similar to a lever, the engaging pin 155 makes contact with and presses the side end (the upper part in the figure) of the cam hole 162, thereby turning the second lever member 161 and the first holder 131 about the retaining pin 135 in the counterclockwise direction. During the turn of the second lever member 161 and the first holder 131, the driving element 132 is caused to pass over the high portion 123*a* of the cam face 123. Then, the driving element 132 is returned to the neutral position between the two cam faces 123 by the spring force of the spring 133, and the first holder 131 and the control lever 145 also return to the neutral position shown in FIG. 15.

In the conventional turn signal switch, as shown in, for example, FIG. 16, the spring member 156 includes the pair of winding portions 156*a* to be fitted on the two pins 125 and 126, and the end portions 156*b* extending inward from the winding portions 156*a* so as to intersect each other, and both the end portions 156*b* are in elastic contact with the side face of the receiving portion 154.

In this way, the first lever member 151 is always pressed at two points by the end portions 156*b* of the spring member 156. Since the end portions 156*b* do not always have the same pressing force (spring force), the position of the first lever member 151 is not fixed, and as a result, the canceling point is not fixed. Furthermore, when the end portions 156*b* have different pressing forces (spring forces), the parts, e.g., the engaging pin 155, undergo localized wear, which hinders smooth operation, causes unreliable cancellation, and produces unusual noises.

SUMMARY OF THE INVENTION

The present invention has been made to solve such problems of the conventional art, and an object of the present invention is to provide a turn signal switch that provides a fixed canceling point, stable operation, and constant operation feel without causing wear of parts and unusual noises incidental thereto.

In order to achieve the above object, according to an aspect of the present invention, there is provided a turn signal switch including a housing having a cam portion; a control lever turnably supported in the housing; a driving element for holding the control lever at three positions, first and second operating positions and a neutral position, in cooperation with the cam portion; a lever member, composed of, for example, a first lever member and a second lever member, turnably supported in the housing so as to return the control lever from the first and second operating positions to the neutral position; and a spring member, e.g., a torsion coil spring, for elastically urging the lever member toward a canceling projection that turns together with a steering wheel.

When the control lever is in the neutral position, the lever member is retracted outside the locus of turning of the canceling projection by the control lever. When the control lever is in the first or second operating position, the lever member is advanced inside the locus of turning of the canceling projection by the urging force of the spring member. In this case, the spring member is in elastic contact with the lever member at one point.

According to the present invention, as described above, since the spring member is in elastic contact with the lever member at one point, the spring force is approximately constant, which differs from that in the conventional art in which the lever member is pressed by both ends of the spring member. Therefore, the canceling point is fixed, operation is stable, localized wear of parts and unusual noises incidental thereto do not arise, and a constant operation feel can be obtained.

Further objects, features, and advantages of the present invention will become apparent from the following description of the preferred embodiments with reference to the attached drawings.

DESCRIPTION OF THE PREFERRED EMBODIMENTS

The preferred embodiments of the present invention will be described below with reference to the attached drawings.

Figure 1:
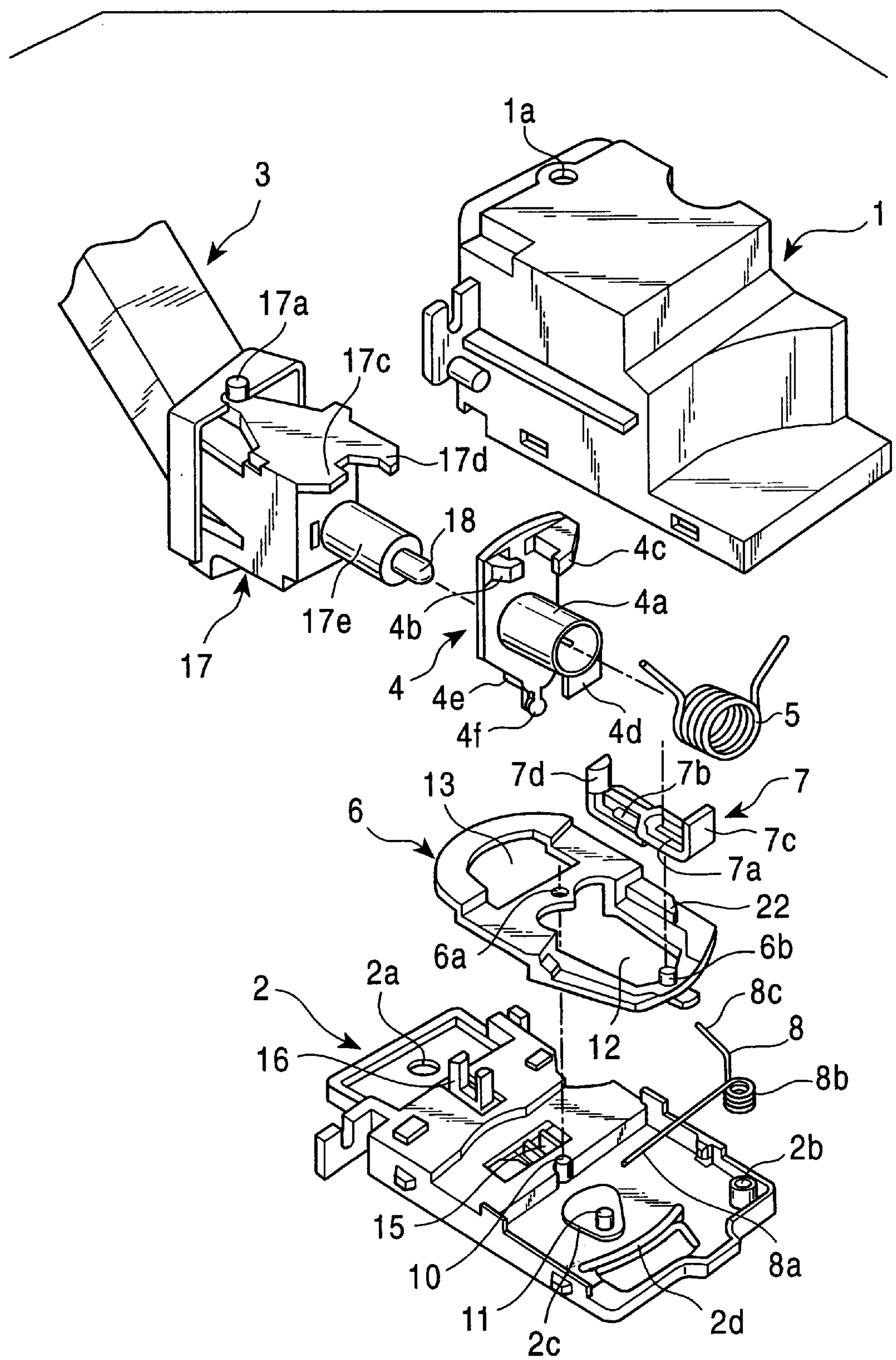
FIG. 1 is an exploded perspective view of a turn signal switch according to a first embodiment of the present invention.
Figure 2:
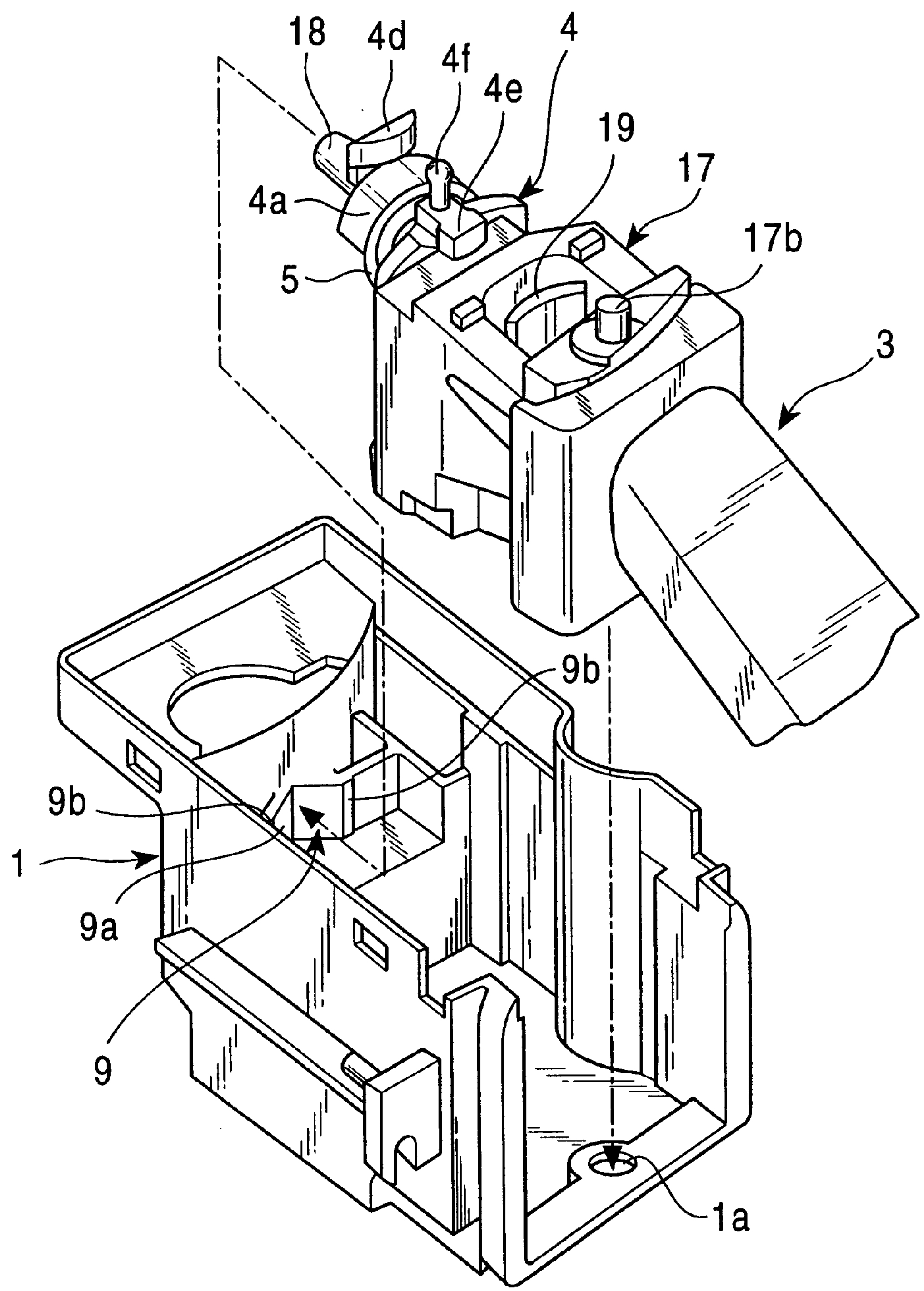
FIG. 2 is a perspective view showing how a control lever is incorporated into a first case provided in the turn signal switch.
Figure 3:
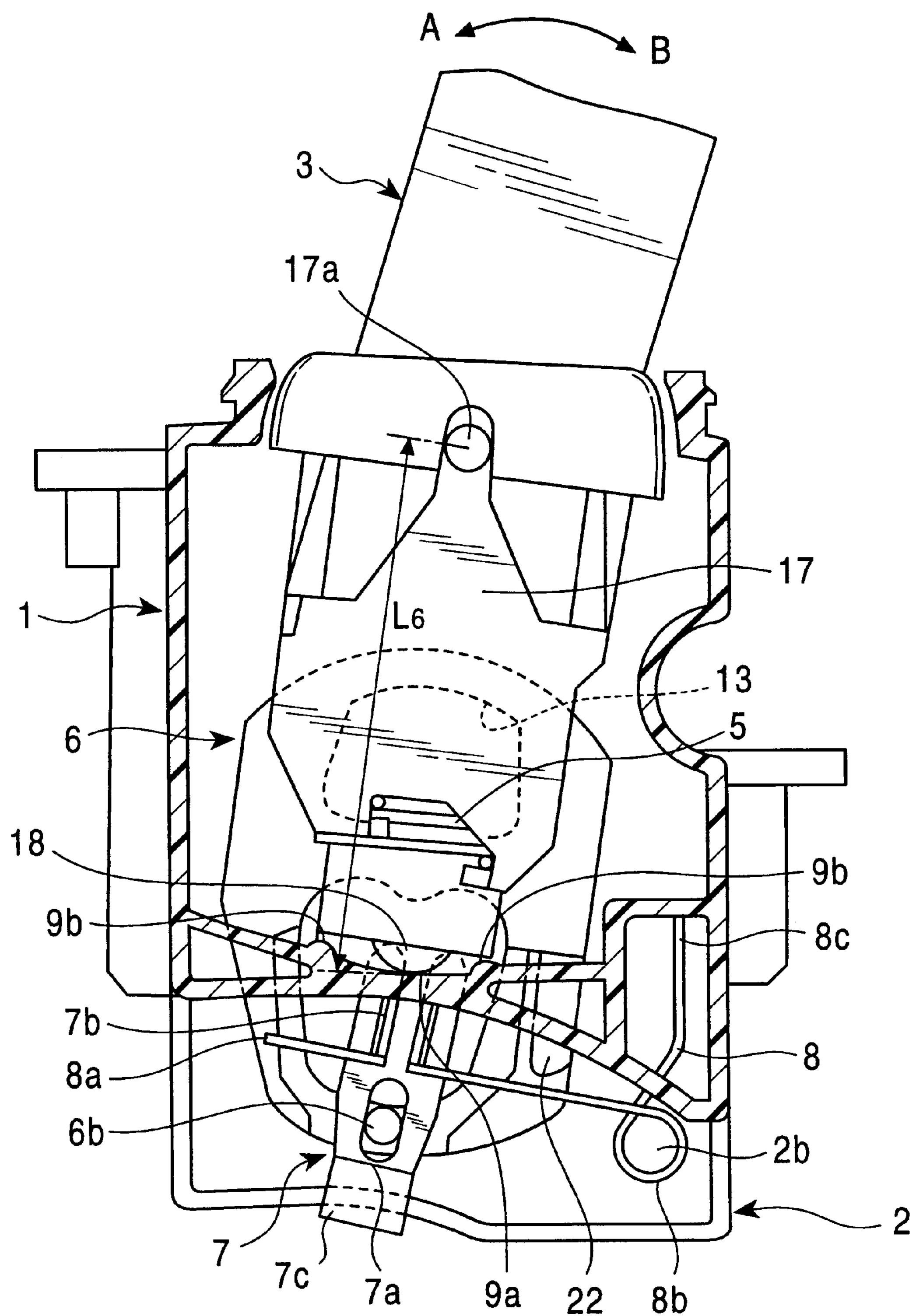
FIG. 3 is a cross-sectional view of the turn signal switch.
Figure 4:
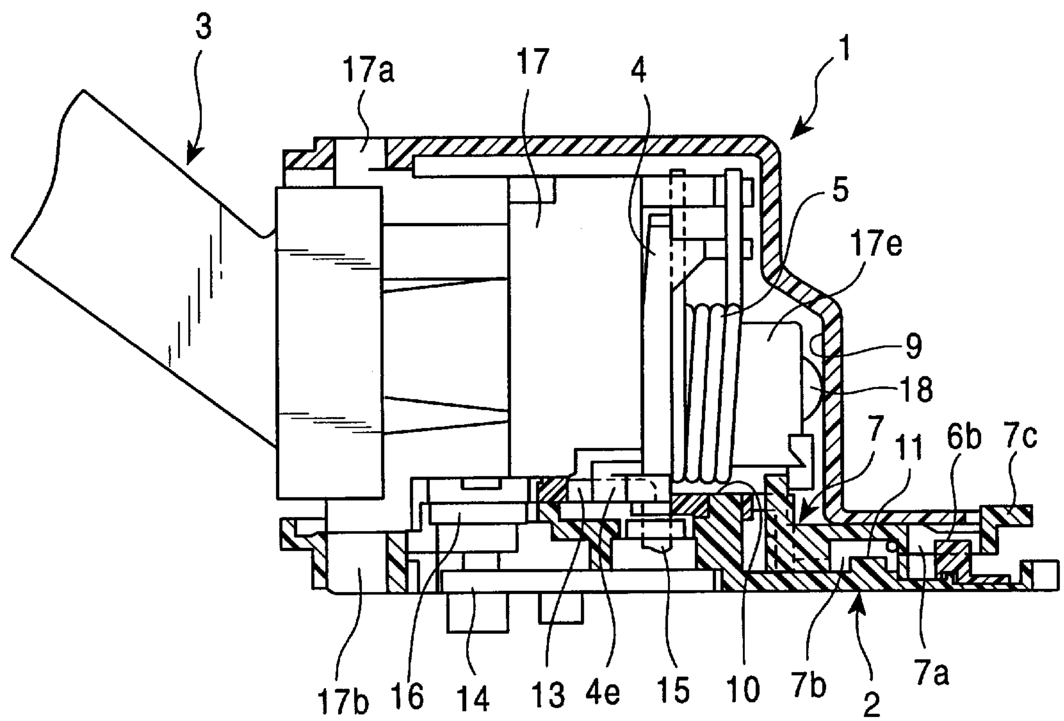
FIG. 4 is a longitudinal sectional view of the turn signal switch.
Figure 5:
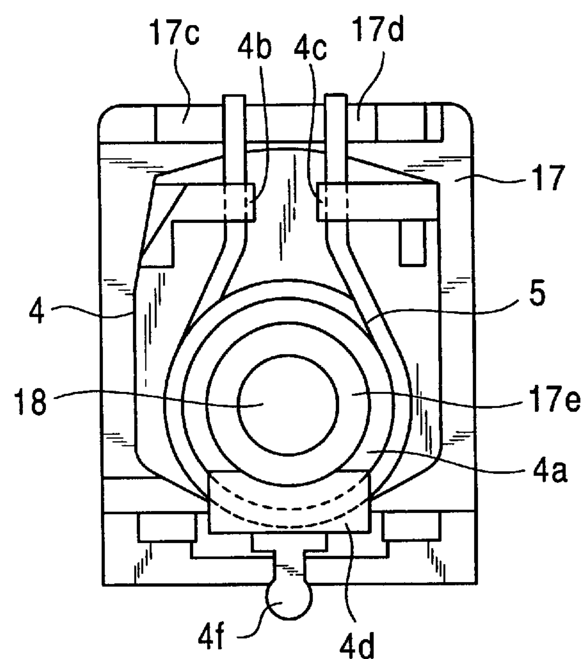
FIG. 5 is a front view of a turning member provided in the turn signal switch.
Figure 6A:
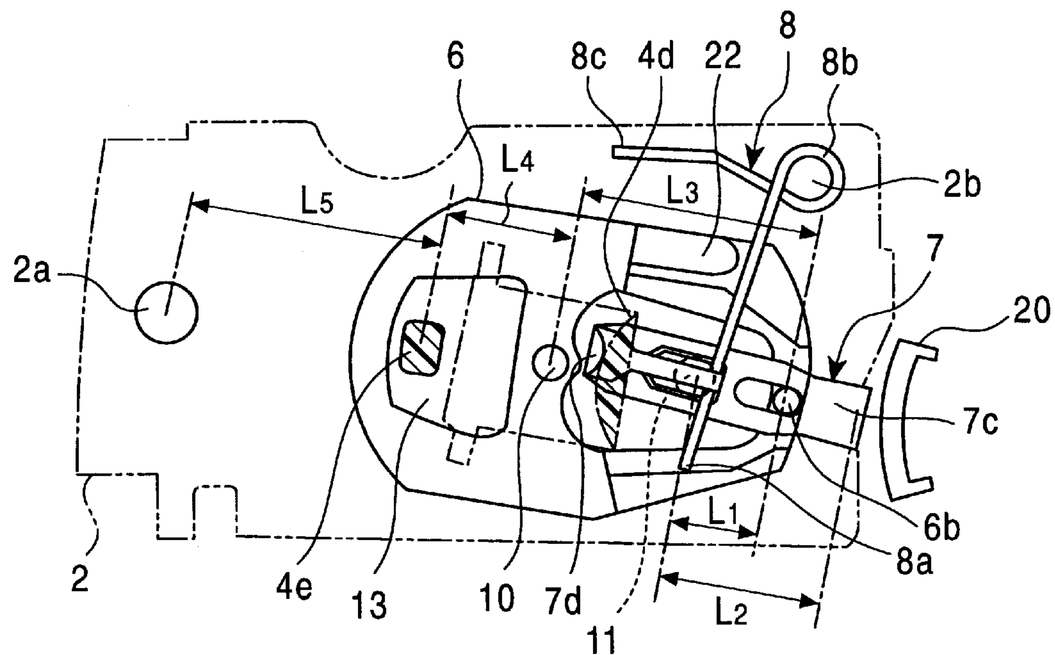
FIGS. 6A and 6B are explanatory views illustrating a canceling operation of the turn signal switch.
Figure 6B:
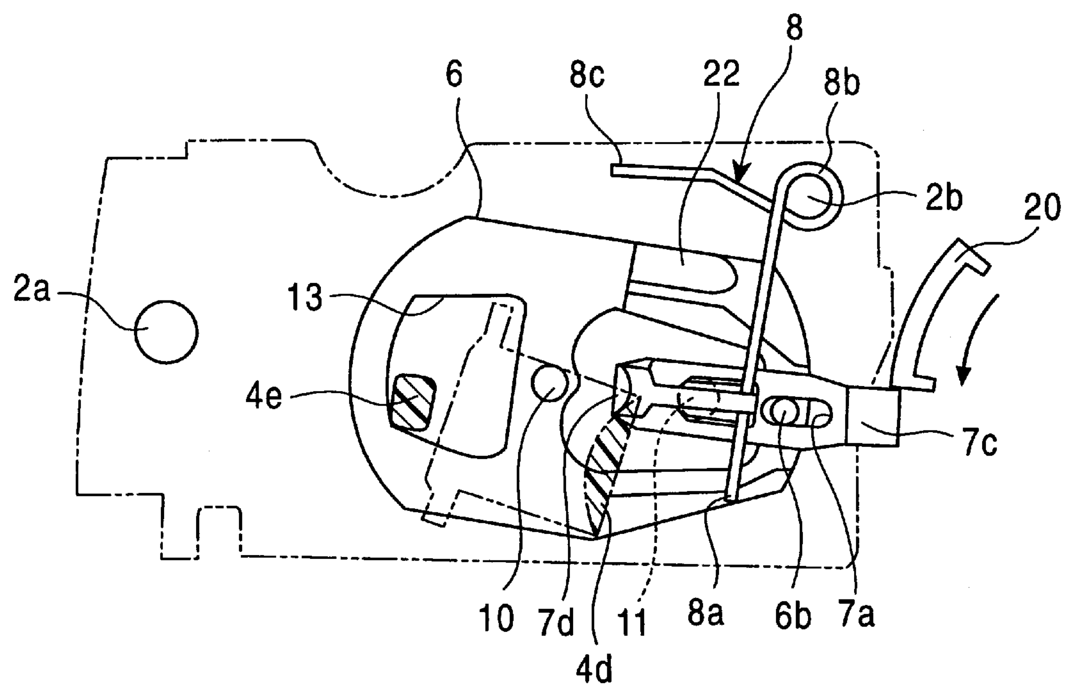
Figure 7A:
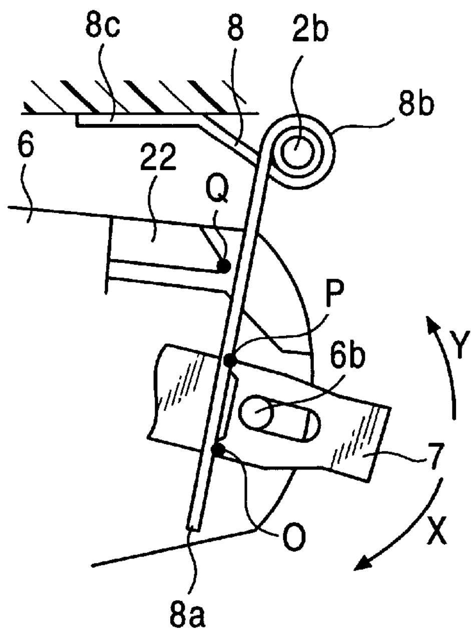
FIGS. 7A and 7B are functional views of a spring force strengthening contact portion in the turn signal switch.
Figure 7B:
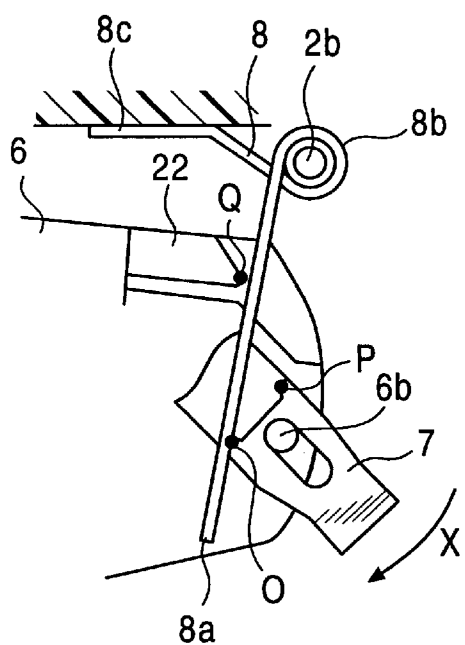

FIG. 1 is an exploded perspective view of a turn signal switch according to a first embodiment of the present invention, FIG. 2 is a perspective view showing how a control lever is incorporated into a first case provided in the turn signal switch, FIG. 3 is a cross-sectional view of the turn signal switch, FIG. 4 is a longitudinal sectional view of the turn signal switch, FIG. 5 is a front view of a turning member provided in the turn signal switch, FIGS. 6A and 6B are explanatory views illustrating a canceling operation of the turn signal switch, and FIGS. 7A and 7B are explanatory views showing the function of a spring force strengthening contact portion.

Referring to FIG. 1, a turn signal switch according to the first embodiment mainly comprises first and second cases 1 and 2 joined to constitute a housing; a control lever 3 turnably supported by both the cases 1 and 2; a turning member 4 turnably supported by the control lever 3; a return spring 5 for allowing the turning member 4 to automatically return to the center position; first and second lever members 6 and 7 placed on the upper surface of the second case 2; and a torsion coil spring 8 for elastically urging the second lever member 7 in a direction such that the second lever member 7 projects from the second case 2. The first and second cases 1 and 2 are fixed to a column cover, a stator member of a combination switch, or the like (not shown).

As shown in FIGS. 2 to 4, a V-shaped cam face 9 is formed inside the first case 1. The cam face 9 includes a center low portion 9*a*, and convex lock portions 9*b* placed on both sides thereof. The first case 1 and the second case 2 are combined by means of, for example, snapping, and are provided with holes 1*a* and 2*a*, respectively, on which the control lever 3 pivots.

On the inner bottom face of the second case 2, a first support shaft 10 and a second support shaft 11 stand at a predetermined interval, and the first lever member 6 is pivotally supported by the first support shaft 10. The first lever member 6 has first and second through holes 12 and 13, and a hole 6*a* formed therebetween so as to be fitted on the first support shaft 10. A support shaft 6*b* stands at the leading end of the first lever member 6, and pivotally supports the second lever member 7.

The second lever member 7 has first and second slots 7*a* and 7*b* in which the support shaft 6*b* and the second support shaft 11 are inserted, respectively. The first and second slots 7*a* and 7*b* are colinear in the lengthwise direction. The second lever member 7 also has an abutting portion 7*c* and a cam portion 7*d* standing at front and rear ends thereof. The cam portion 7*d* is semi-circular in cross section.

The second lever member 7 is engaged with one arm 8*a* of the torsion coil spring 8, and is thereby elastically urged by the torsion coil spring 8 in the lengthwise direction of the slots 7*a* and 7*b*. A winding portion 8*b* of the torsion coil spring 8 is fitted on a boss portion 2*b* standing on the inner bottom surface of the second case 2, and the other arm 8*c* thereof is retained by the side wall of the second case 2. A rib-shaped spring force strengthening contact portion 22 is formed in the portion of the first lever member 6 adjacent to the boss portion 2*b*. The function thereof will be described later with reference to FIGS. 7A and 7B.

A stepped portion 2*c* and a rib 2*d* are formed on the inner bottom surface of the second case 2 so as to be in contact with the bottom surface of the second lever member 7, thereby reducing the contact resistance between the second case 2 and the second lever member 7.

As shown in FIG. 4, a printed wiring board 14 is mounted on the bottom surface of the second case 2, and a pair of sliding element supporting members 15 and 16 are exposed from the inner bottom face of the second case 2 so as to slide on the printed wiring board 14.

One of the sliding element supporting members 15 can move in the breadthwise direction of the second case 2, and is driven by the turning motion of the control lever 3 for left or right turn to cause a left-turn or right-turn lamp (not shown) to blink.

The other sliding element supporting member 16 can move in the lengthwise direction of the second case 2, and is driven by the upward pivotal motion of the control lever 3 to turn a beam lamp (not shown) on. The sliding element supporting members 15 and 16 are provided with movable contacts (not shown), respectively, that make contact with and separate from a fixed contact formed on the printed wiring board 14.

A holder 17 is attached to the control lever 3, and is provided with support shafts 17*a* and 17*b* projecting from the upper and bottom surfaces thereof so as to be inserted in the holes 1*a* and 2*a*. While the control lever 3 and the holder 17 turn together about a straight line, which links the holes 1*a* and 2*a* (the support shafts 17*a* and 17*b*) in the horizontal direction, they are connected by a beam driving mechanism (not shown) so that the control lever 3 can pivot vertically relative to the holder 17 through a predetermined angle.

The holder 17 also has a pair of spring bearing portions 17*c* and 17*d* on the upper surface, and a cylindrical portion 17*e* on the front side thereof. A driving element 18 is slidably held inside the cylindrical portion 17*e* so that the leading end thereof is always pressed against the cam face 9 of the first case 1 by a spring (not shown) (see FIGS. 2 and 3).

As shown in FIG. 5, a cylindrical body 4*a* formed in the turning member 4 is fitted on the cylindrical portion 17*e*, and the turning member 4 is held in the holder 17 so as to turn along the surface of the cylindrical portion 17*e*.

A pair of spring bearing portions 4*b* and 4*c* are formed on the top of the turning member 4. By hooking both arms of the return spring 5 wound on the cylindrical body 4*a* on the spring bearing portions 4*b* and 4*c*, and the sprig bearing portions 17*c* and 17*d* of the holder 17, respectively (see FIG. 5), the turning member 4 is always urged toward the neutral position. A cam portion 4*d* having a semicircular cross section is provided in a hanging manner at the leading bottom end of the cylindrical body 4*a* so as to face the cam portion 7*d* of the second lever member 7 (see FIGS. 6A and 6B).

A driving portion 4*e* is also provided in a hanging manner at the bottom end of the turning member 4 so as to project in the second through hole 13 of the first lever member 6, and has a projection 4*f* provided in a hanging manner so as to engage with the sliding element supporting member 15. A projection 19 is formed at the bottom end of the control lever 3 (see FIG. 2), and is engaged with the sliding element supporting member 16.

The operation of the turn signal switch will be described mainly with reference to FIGS. 6A and 6B. When the control lever 3 is in the neutral position, as shown in FIG. 3, the leading end of the driving element 18 is in contact with the center low portion 9*a* of the cam face 9, and is held in that position by elasticity of a spring (not shown).

In this case, as shown in FIG. 6A, the cam portion 4*d* of the turning member 4 and the cam portion 7*d* of the second lever portion 7 make contact with each other adjacent to the tops thereof, and the second lever member 7 is placed in a retracted position against the urging force of the torsion coil spring 8. Therefore, the contact portion 7*c* of the second lever member 7 is outside the locus of turning of a canceling projection 20 provided in a rotor that rotates together with the steering wheel. Even when the steering wheel is turned in this state, the canceling projection 20 does not make contact with the contact portion 7*c* of the second lever member 7, so that the control lever 3 remains in the neutral position.

When the control lever 3 is turned from the neutral position in the direction of the arrow A or B of FIG. 3, the leading end of the driving element 18 passes over the slope of the cam face 9, and is retained and stably held in that position by the lock portion 9*b*. For example, when the control lever 3 is turned in the direction of the arrow B, the turning member 4 turns in response thereto, and the cam portion 4*d* and the driving portion 4*e*, which are hatched in FIG. 6A, shift to the positions shown in FIG. 6B. As a result, the cam portion 4*d* of the turning member 4 separates from the top of the cam portion 7*d* of the second lever member 7, the second lever member 7 is advanced in the lengthwise direction of the slots 7*a* and 7*b* by elastic force of the torsion coil spring 8, and the contact portion 7*c* enters the inside of the turning locus of the canceling projection 20.

With the turn of the control lever 3 in the direction of the arrow B, the projection 4*f* at the bottom end of the turning member 4 moves the sliding element supporting member 15 horizontally. Therefore, the sliding element supporting member 15 switches the contact, so that a right-turn lamp (not shown) blinks.

When the steering wheel in the right-turn state shown in FIG. 6B is turned in the opposite direction (in the direction of the arrow of FIG. 6B), the canceling projection 20 makes contact with the contact portion 7*c* of the second lever member 7 while the steering wheel returns to the center position. As a result, the second lever member 7 turns about the second support shaft 11 in the clockwise direction in FIG. 6B, and the first lever member 6 having the support shaft 6*b* engaged with the first slot 7*a* is thereby turned about the first support shaft 10 clockwise. Therefore, the second through hole 13 of the first lever member 6 shifts upward in FIG. 6B.

Since the edge of the second through hole 13 presses the driving portion 4*e* of the turning member 4 upward, the driving element 18 disengages from the lock portion 9*b* of the cam face 9, and moves to the center low portion 9*a*. The control lever 3 and the first and second lever members 6 and 7 automatically return to their neutral positions shown in FIG. 6A.

When it is assumed that the distance between the support shaft 6*b* and the second support shaft 11, the distance between the contact portion 7*c* and the second support shaft 11, the distance between the support shaft 6*b* and the first support shaft 10, the distance between the first support shaft 10 and the driving portion 4*e*, the distance between the driving portion 4*e* and the hole 2*a* (the center point on which the control lever 3 turns), and the distance between the support shaft 17*a* (the hole 2*a* ) and the lock portion 9*b* (see FIG. 3) are $L_1$, $L_2$, $L_3$, $L_4$, $L_5$, and $L_6$, respectively, the cancellation ratio Pi (the percentage of the driving force produced in the lock portion 9*b* of the cam face 9 to the force produced in the canceling projection 20) is expressed as follows:

$$Pi=(L_2/L_1)\times(L_3/L_4)\times(L_5/L_6)$$

When the steering wheel in the right-turn state shown in FIG. 6B is turned in the opposite direction with the control lever 3 held, the edge of the second through hole 13 presses the driving portion 4*e* of the turning member 4, as described above, whereas the control lever 3 does not automatically return because it is held. In this case, the turning member 4 turns along the peripheral surface of the cylindrical portion 17*e* against the return spring 5. When the canceling projection 20 passes the contact portion 7*c* of the second lever member 7, the turning member 4 automatically returns to the center position of the holder owing to the return spring 5, and is thereby kept in the right-turn state shown in FIG. 6B. Since the turn of the first lever member 6 incidental to the canceling operation is absorbed by the turn of the turning member 4 in this way, it is possible to prevent damage to the constituents of the power transmission system including the levers 5 and 6, and the driving portion 4*e*.

When the steering wheel in the right-turn state shown in FIG. 6B is further turned in the right-turn direction, the canceling projection 20 makes contact with the contact portion 7*c* of the second lever member 7 from the direction opposite from the arrow of FIG. 6B, and the second lever member 7 and the first lever member 6 turn in the counter-clockwise direction opposite from the above direction for cancellation.

In this case, the cam portion 7*d* of the second lever member 7 smoothly slides on the peripheral surface of the cam portion 4*d* of the turning member 4, and the first lever member 6 turns in a direction such that the edge of the second through hole 13 separates from the driving portion 4*e*. Therefore, the control lever 3 does not return to the neutral position, but remains in the right-turn position.

FIGS. 7A and 7B illustrate the function of the spring force strengthening contact portion 22. As shown in these figures, the spring force strengthening contact portion 22 is formed in the form of a rib on the upper surface of the first lever member 6, where one arm 8*a* of the torsion coil spring 8 is placed, and adjacent to the boss portion 2.

The second lever member 7 can turn in the X-direction (reverse-canceling direction) or the Y-direction (canceling direction), and is in contact with one arm 8*a* of the torsion coil spring 8. When the second lever member 7 turns in the X-direction, it makes contact with the arm 8*a* of the torsion coil spring 8 at a point O. In contrast, when the second lever member 7 turns in the Y-direction, it makes contact with the arm 8*a* at a point P.

If the spring force strengthening contact portion 22 is not provided, the arm 8*a* of the torsion coil spring 8 is supported only by the boss portion 2*b* (fulcrum), and the spring force $F_1$ (return force) produced when the second lever member 7 is turned in the X-direction is less than the spring force $F_2$ (return force) produced when the second lever member 7 is turned in the Y-direction ($F_1<F_2$). The spring force strengthening contact portion 22 is provided to eliminate this imbalance. As shown in FIG. 7B, when the second lever member 7 is turned in the X-direction, the middle portion (point Q) of the torsion coil spring 8 makes contact with the spring force strengthening contact portion 22, and the point Q functions as the second fulcrum, whereby the distance to the contact point O is shortened. This strengthens the spring force so that the return force $F_1$ is approximately equal to the return force $F_2$.

Figure 8:
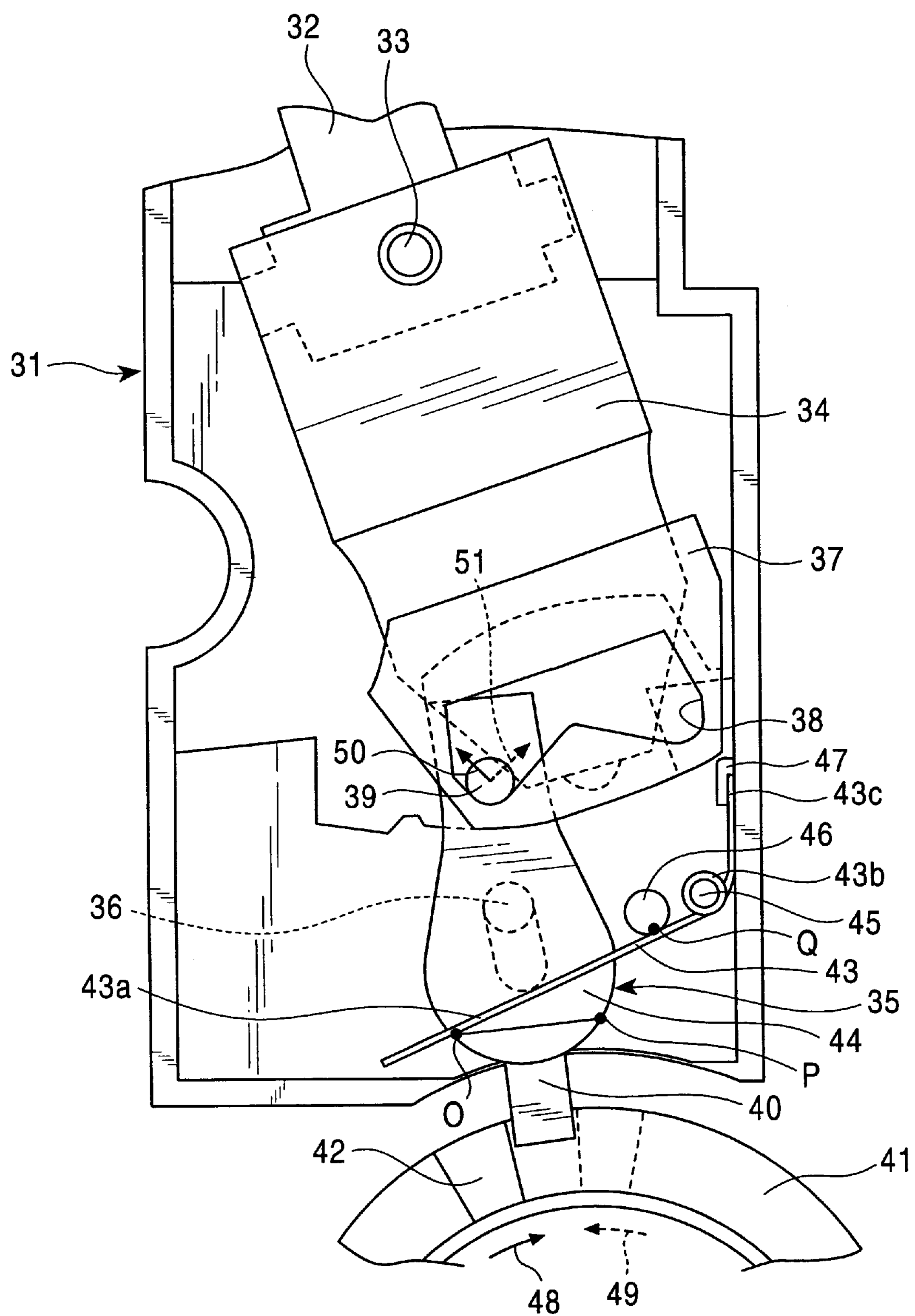
FIG. 8 is a functional view of a spring strengthening contact portion in a turn signal switch according to a second embodiment of the present invention.

FIG. 8 is a plan view showing a turn signal switch according to a second embodiment of the present invention. The turn signal switch of this embodiment comprises a case 31, a control lever 32, a support shaft 33, a holder 34, a second lever member 35 having a retaining pin 36, a first lever member 37 having a cam hole 38, an engaging pin 39 provided in the second lever member 35, an engaging projection 40 provided in the second lever member 35, a canceling cam 41 having a canceling projection 42, and a torsion coil spring 43. One end 43*a* of the torsion coil spring 43 is in elastic contact with a projection 44 of the second lever member 35, a winding portion 43*b* thereof is fitted on a boss portion 45 of the case 31, and the other end 43*c* thereof is retained by a holding portion 47 of the case 31.

A pin-shaped spring force strengthening contact portion 46 is provided adjacent to the boss portion 45 so as not to interfere with the turn of the second lever member 35. The arrows 48 and 49 represent the canceling direction and the reverse-canceling direction of the canceling cam 41, and the arrows 50 and 51 represent the canceling direction and the reverse-canceling direction of the engaging pin 39.

In this embodiment, one end (contact point O) of the projection 44 also makes elastic contact with the torsion coil spring 43 when the second lever member 35 turns in the reverse-canceling direction (the arrow 49), and the other end (contact point P) makes elastic contact with the torsion coil spring 43 when the second lever member 35 turns in the canceling direction (the arrow 48). As shown in FIG. 8, when the second lever member 35 is turned in the reverse-canceling direction (the arrow 49), the middle portion (point Q) of the torsion coil spring 43 makes contact with the spring force strengthening contact portion 46, and the point Q functions as the second fulcrum. This shortens the distance to the contact point O to strengthen the spring force (return force).

Figure 9A:
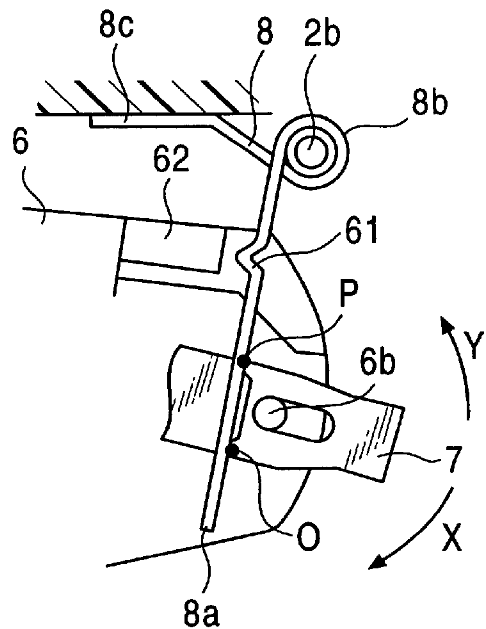
FIGS. 9A and 9B are plan views of a turn signal switch according to a third embodiment of the present invention.
Figure 9B:
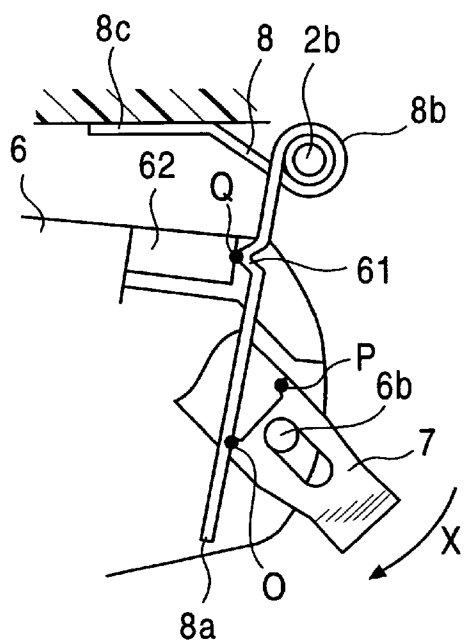
Figure 10:
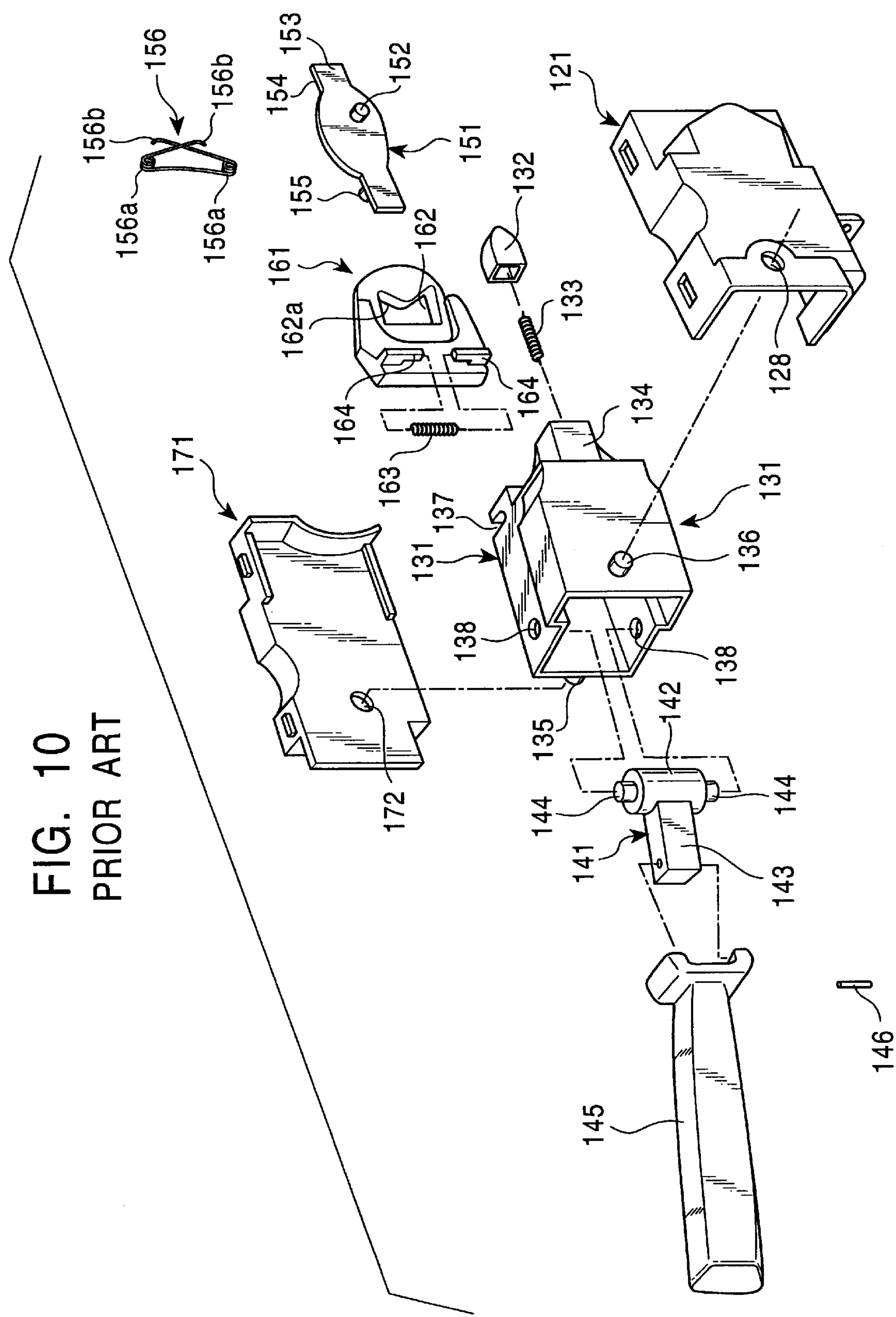
FIG. 10 is an exploded perspective view of a conventional turn signal switch, as viewed from below.
Figure 11:
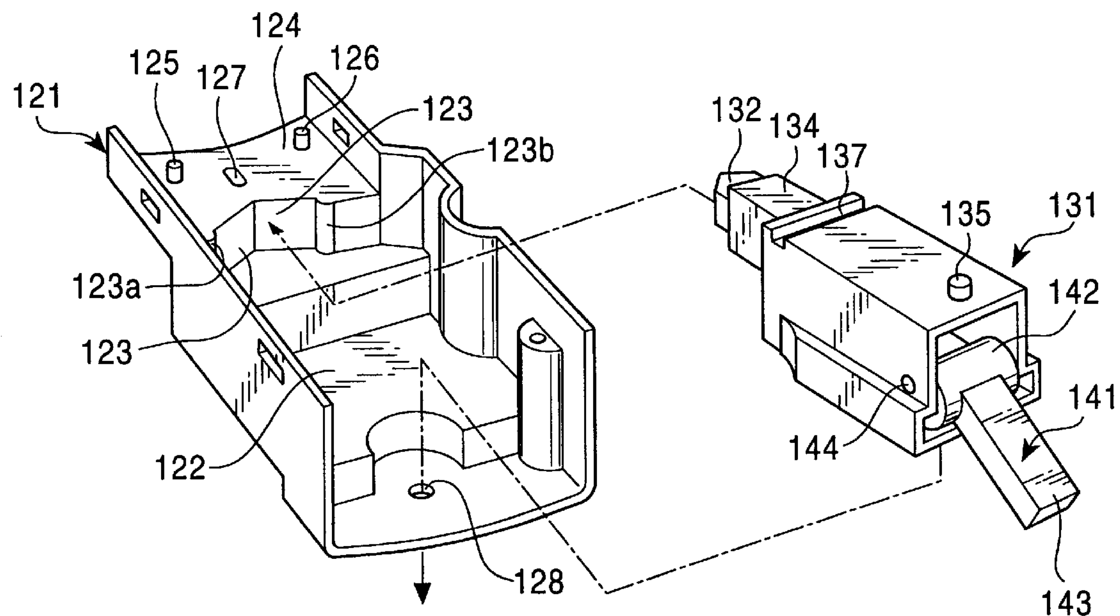
FIG. 11 is a perspective view illustrating how a first holder is incorporated into a case of the turn signal switch.
Figure 12:
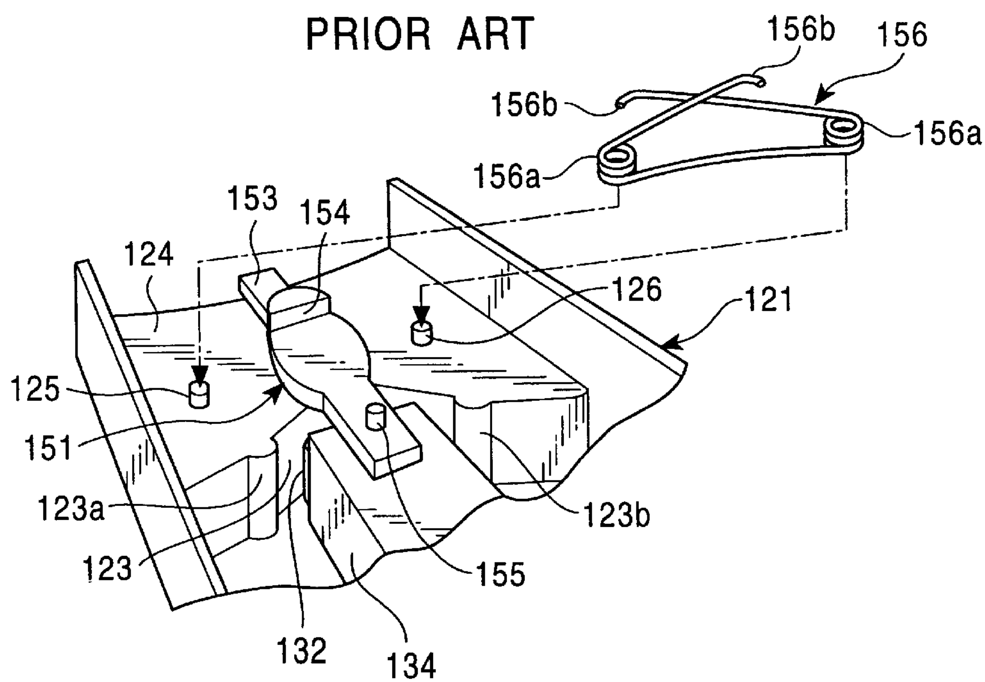
FIG. 12 is a perspective view illustrating how a first lever member and a press spring are further incorporated in the state shown in FIG. 11.
Figure 13:
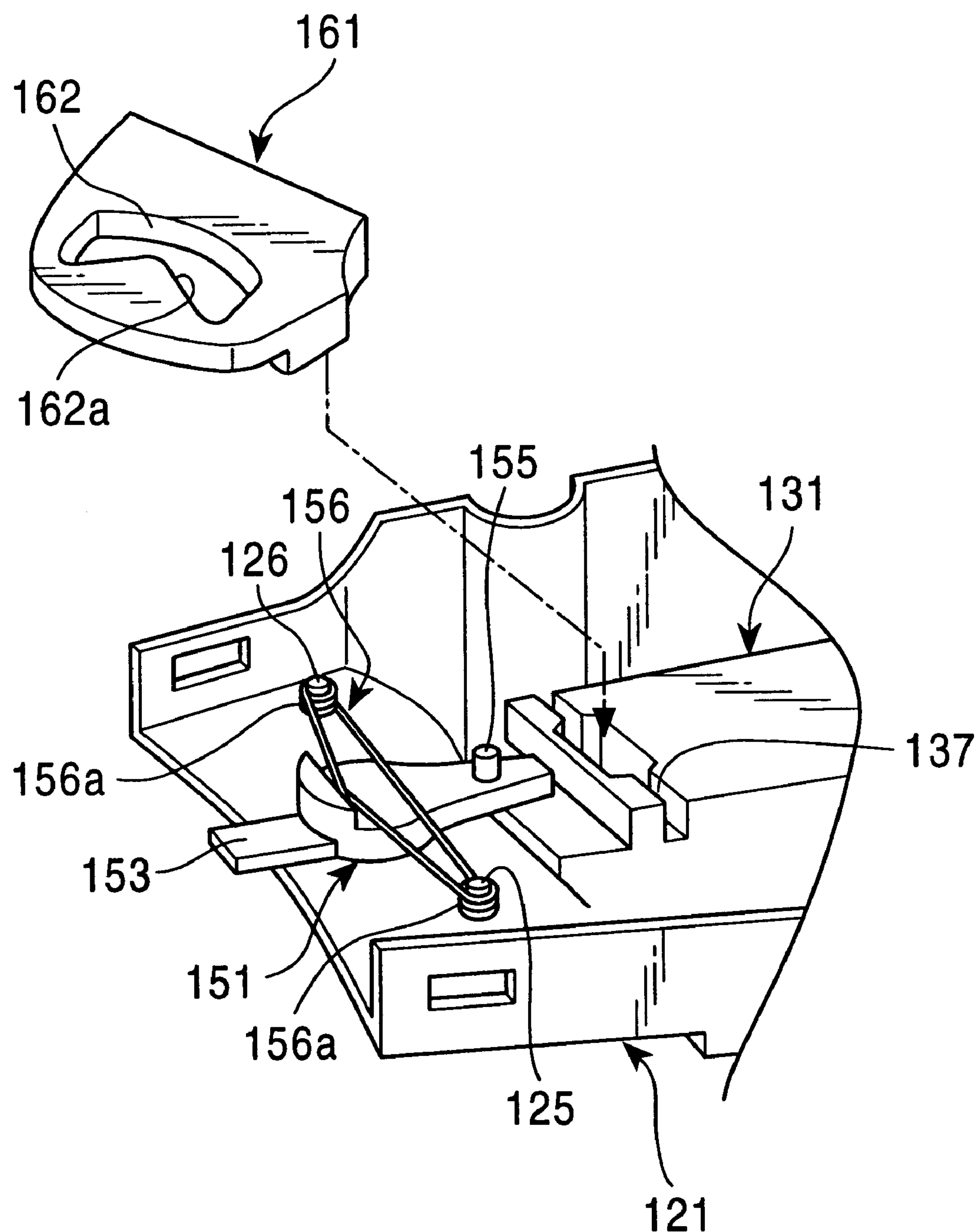
FIG. 13 is a perspective view illustrating how a second lever member is further incorporated in the state shown in FIG. 12.
Figure 14:
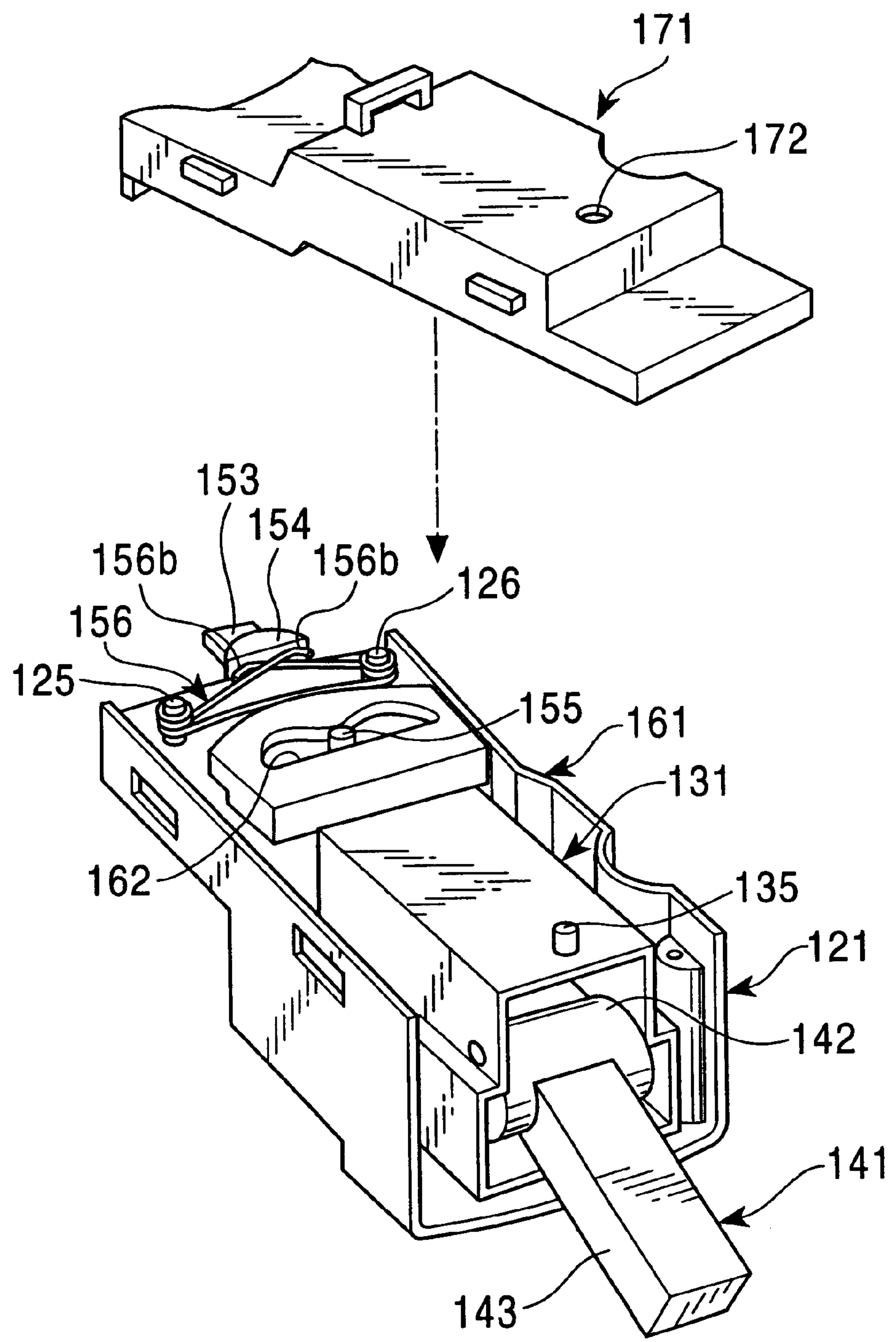
FIG. 14 is a perspective view illustrating how a cover is incorporated in the state shown in FIG. 13.
Figure 15:
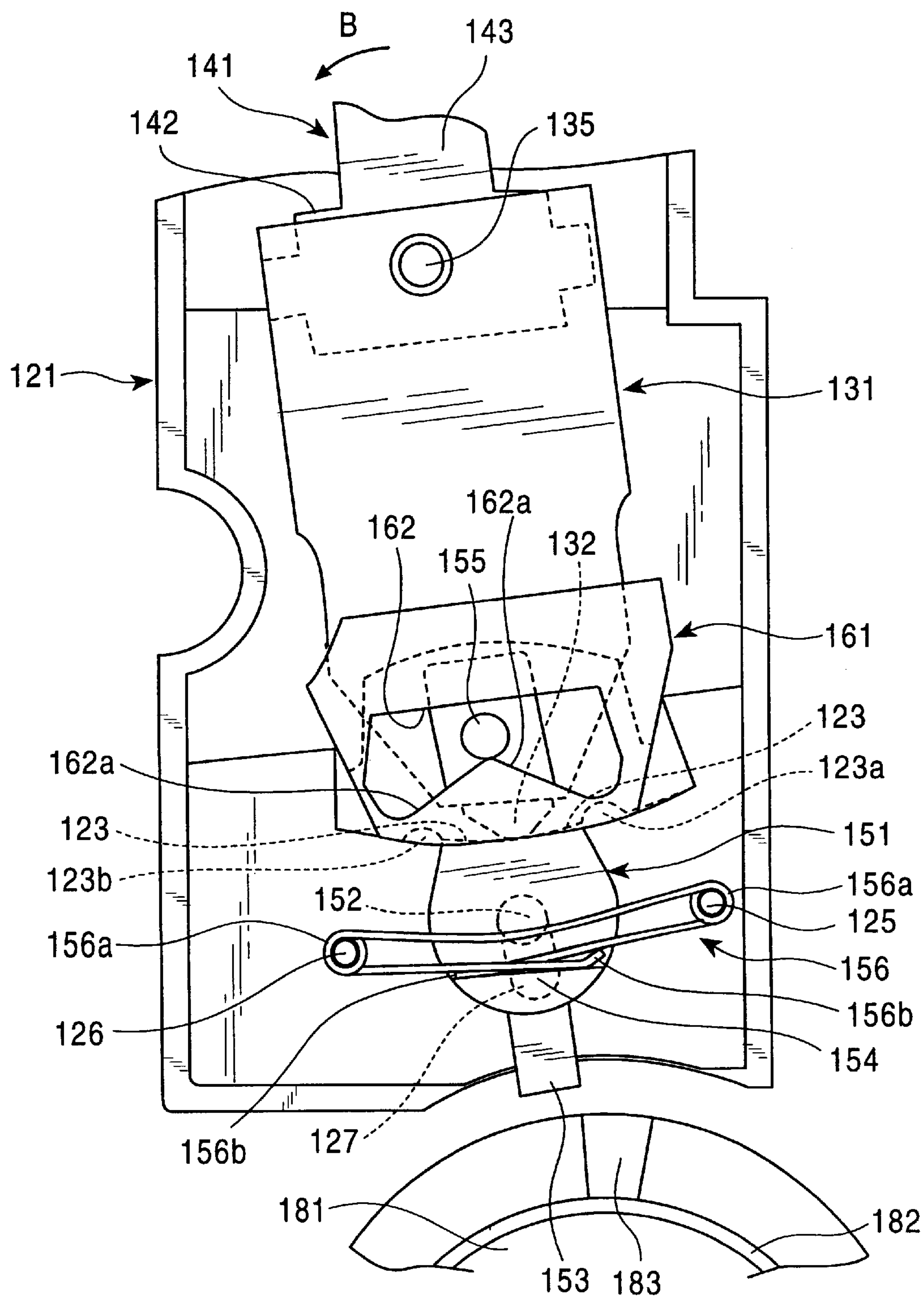
FIG. 15 is a plan view of the turn signal switch in the neutral state, from which the cover is removed, for illustrating the operation thereof.
Figure 16:
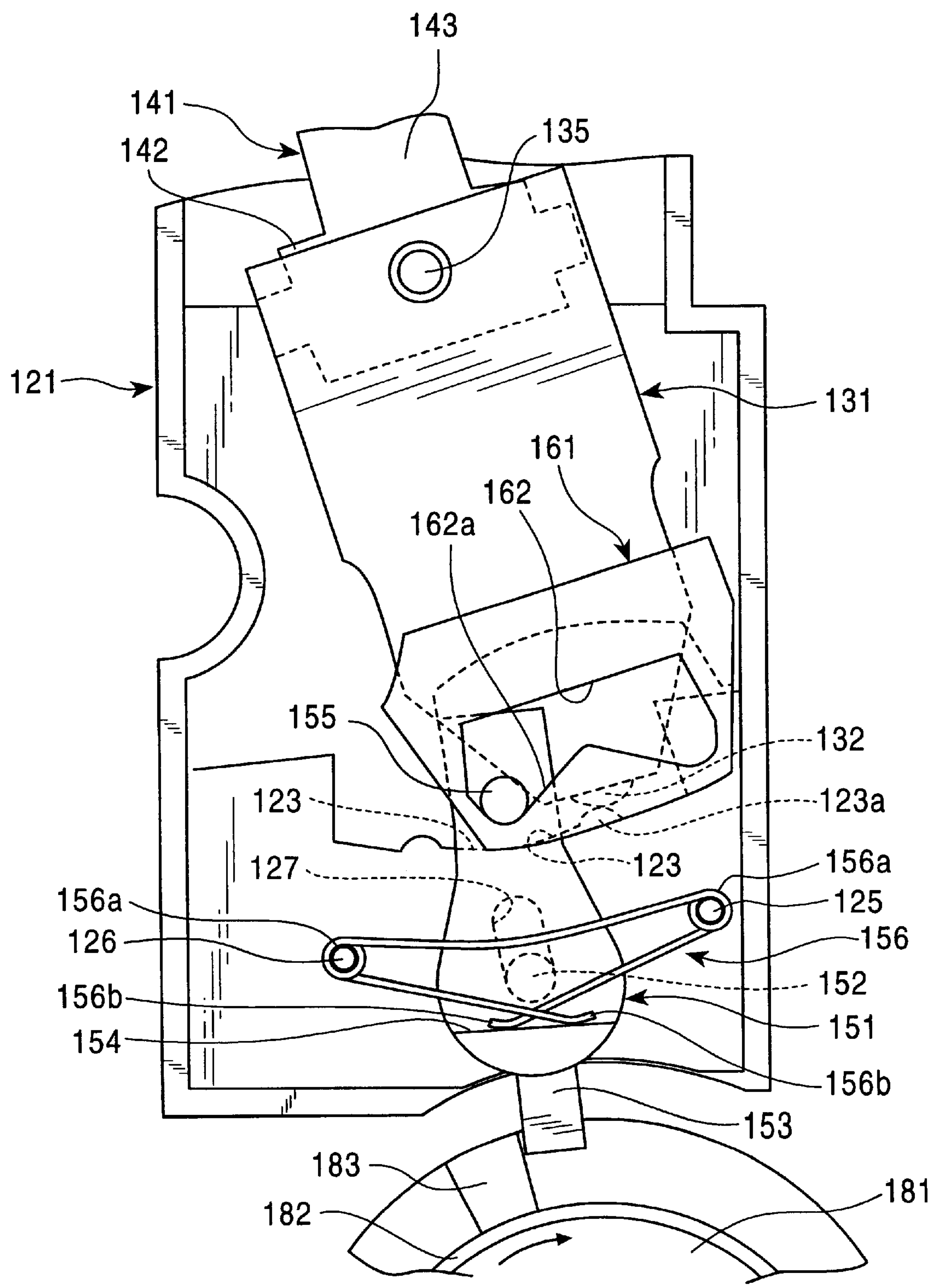
FIG. 16 is a plan view of the turn signal switch in a state in which the control lever is switched to the right-turn or left-turn direction, from which the cover is removed, also for illustrating the operation thereof.

FIGS. 9A and 9B are functional views of a third embodiment of the present invention. In this embodiment, a spring force strengthening contact portion 61 having a bent shape is formed at the midpoint of one end 8*a* of a torsion coil spring 8, and a first lever member 6 has a convex abutting portion 62 on which the spring force strengthening contact portion 61 abuts.

As shown in FIG. 9B, when a second lever member 7 is turned in the X-direction, the spring force strengthening contact portion 61 of the torsion coil spring 8 makes contact with the abutting portion 62, and a point Q functions as the second fulcrum. This shortens the distance to a contact point O, and strengthen the spring force so that the return force $F_1$ is approximately equal to the return force $F_2$. While the abutting portion 62 is formed in the first lever member 6 in this embodiment, it may be formed on the side of the housing.

While the torsion coil spring is used as a spring member for return in this embodiment, other types of spring members, e.g., a plate spring, may be used.

As described above, since the spring member is in elastic contact with the lever member at one point, the spring force is approximately constant, which differs from that in the conventional art in which the lever member is pressed by both ends of the spring member. Therefore, the canceling point is fixed, operation is stable, localized wear of parts and unusual noises incidental thereto do not arise, and a constant operation feel can be obtained.

When the spring member is cantilevered, and the contact point between the spring member and the lever member is apart from the fulcrum of the spring member, the second fulcrum provided between the fulcrum and the contact point makes it possible to make the force for returning the control lever from the first operating position to the neutral position equal to the force for returning the control lever from the second operating position to the neutral position, and to thereby more reliably a fixed operation feel.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A turn signal switch comprising:

a housing having a cam portion;

a control lever turnably supported in said housing;

a driving element for holding said control lever at three positions, first and second operating positions and a neutral position, in cooperation with said cam portion;

a lever member turnably supported in said housing so as to return said control lever from the first and second operating positions to the neutral position; and a spring member for elastically urging said lever member toward a canceling projection that turns together with a steering wheel, wherein said lever member is retracted outside the locus of turning of said canceling projection by said control lever when said control lever is in the neutral position, and is advanced inside the locus of turning of said canceling projection by the urging force of said spring member so that said spring member is in elastic contact with said lever member at one point when said control lever is in the first or second operating position, wherein, when said spring member is cantilevered, and a contact point thereof with said lever member is apart from a fulcrum of said spring member, a second fulcrum is provided between said fulcrum and said contact point.

2. The turn signal switch according to claim 1, wherein said second fulcrum is a spring force strengthening contact portion formed on said lever member.

3. The turn signal switch according to claim 1, wherein said second fulcrum is a spring force strengthening contact portion positioned in said housing.

4. The turn signal switch according to claim 1, wherein said second fulcrum is a bent portion formed in said spring member between said fulcrum and said contact point.

5. The turn signal switch according to claim 1, wherein said spring member is a torsion coil spring.

6. The turn signal switch according to claim 2, wherein said spring member is a torsion coil spring.

7. The turn signal switch according to claim 3, wherein said spring member is a torsion coil spring.

8. A turn signal switch according to claim 4, wherein said spring member is a torsion coil spring.

* * * * *